United States Patent

[11] 3,608,912

| [72] | Inventors | Paul D. Templin;<br>William G. Sonderman; Russell G. Smith,<br>all of Cincinnati, Ohio |
|---|---|---|
| [21] | Appl. No. | 873,804 |
| [22] | Filed | Nov. 4, 1969 |
| [45] | Patented | Sept. 28, 1971 |
| [73] | Assignee | Xomox Corporation<br>Cincinnati, Ohio |

[54] SEALING MEANS FOR VALVE STEMS
14 Claims, 3 Drawing Figs.

[52] U.S. Cl. .................................................. 277/123, 277/102
[51] Int. Cl. .................................................. F16j 15/18
[50] Field of Search .........................................
277/123–125, 102, 104, 110, 112, 113, 116.2, 142

[56] References Cited
UNITED STATES PATENTS

| 1,958,221 | 5/1934 | Wilcox .......................... | 277/125 X |
| 3,489,420 | 1/1970 | Woodling ..................... | 277/153 X |

Primary Examiner—Robert I. Smith
Attorney—J. Warren Kinney, Jr.

ABSTRACT: A seal is formed between a liner sleeve, which surrounds part of a valve stem, and a body through which the valve stem extends, the seal comprising a plurality of O-rings with annular spacers therebetween always out of contact with the valve stem. The inner diameter of each of the annular spacers is greater than the outer diameter of the liner sleeve, so that there is no firm engagement therebetween, and each of the O-rings makes four-point contact with the spacers adjacent thereto, the body, and the liner sleeve, to produce a series of annular-spaced sealing zones.

PATENTED SEP28 1971

INVENTORS
PAUL D. TEMPLIN
WILLIAM G. SONDERMAN
BY RUSSELL G. SMITH

*Warren Kinney jr.*
ATTORNEY

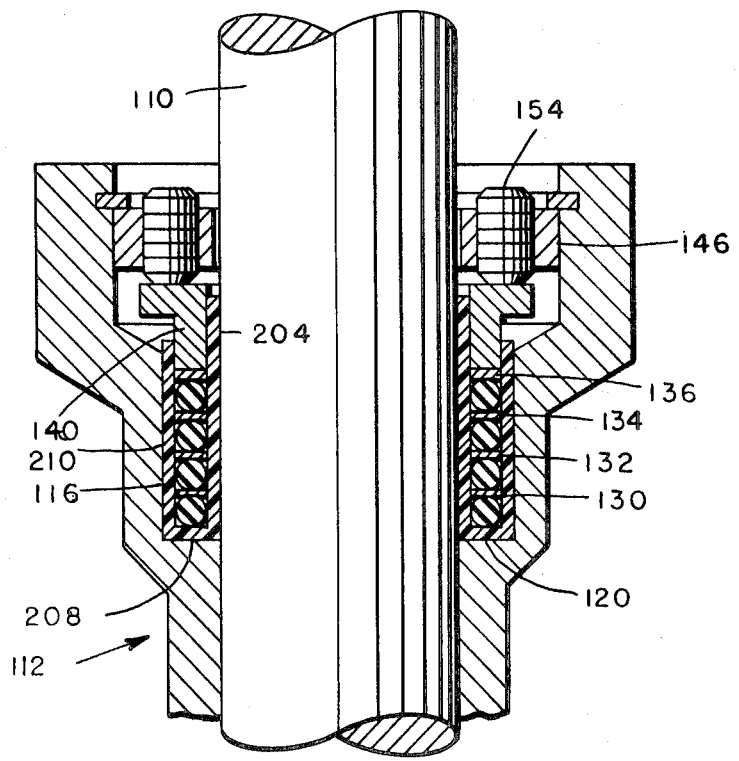

SEALING MEANS FOR VALVE STEMS

This invention relates to means for effecting a fluidtight seal between the cylindrical actuator stem of a valving member and a cylindrical liner sleeve, fabricated, by way of example from polytetrafluoroethylene, or any similar substance characterized by its lubrication qualities and resistance to corrosion, which surrounds at least a portion of the actuator stem.

The sealing means of the present invention are adapted for use with the cylindrical actuator stem of various types of valves including, but not limited to, butterfly valves, plug valves, ball valves and gate valves.

The sealing means is conveniently located within an enlarged bore provided in the upper body portion of a valve body whereby to be easily accessible for adjustment, inspection and/or replacement, when necessary.

Broadly speaking, the invention contemplates as one of its objects, the use of a plurality of resilient O-rings which are arranged in stacked or vertical relationship within the actuator stem-receptive bore of a valve body and wherein adjacent O-rings are separated from one another by spacer rings. The relationship of O-rings and spacer rings within the bore is such as to provide a plurality of individual, spaced, radial compressive forces to the liner sleeve surrounding the valve stem in such a manner as to provide a highly efficient multizone seal which will effectively prevent any and all leakage along the actuator stem or along or through the liner sleeve, or along the stem-receptive bore of the valve body.

Another object of the invention is to provide for a smooth easy manipulation of the valve stem, with a minimum of war and parts replacements.

These and other objects are attained by the means described herein and as disclosed in the accompanying drawings in which:

FIG. 3 is a view like FIG. 2, showing a modification.

Figure 1:
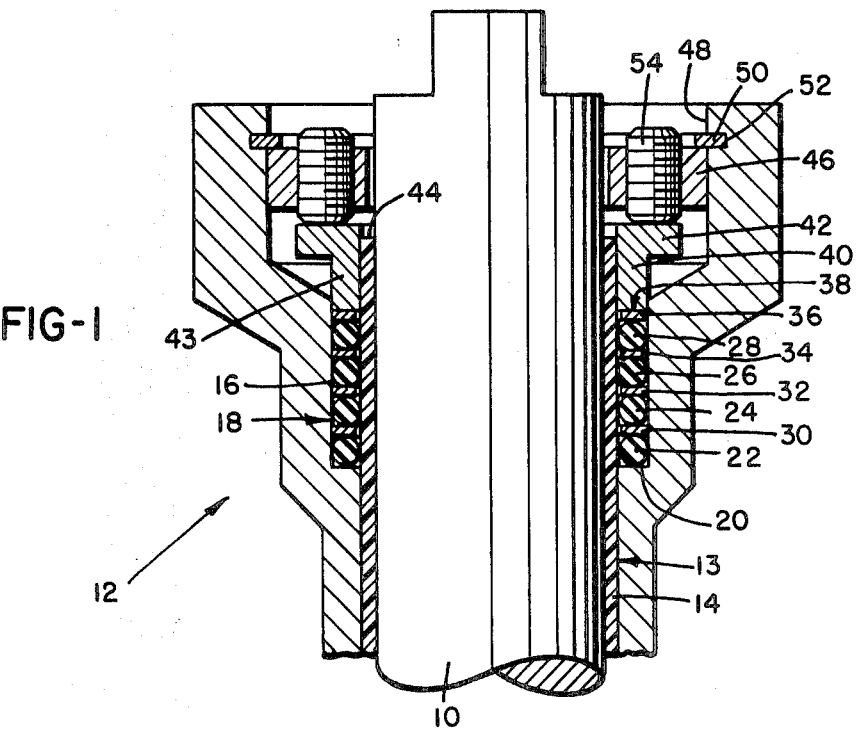
FIG. 1 is a sectional view illustrating the seal of the present invention associated with an actuator stem housed within an elongate liner sleeve such as may be used in butterfly valves.

With particular reference now to FIG. 1, the numeral 10 denotes the actuating member of cylindrical valve stem of a typical butterfly valve which extends upwardly through the stem-receptive bore 13 of a body 12.

The numeral 14 denotes a flexible self-lubricating liner sleeve disposed between valve stem 12 and cylindrical passageway or stem bore 13 in body 12, it being understood that liner sleeve 14 may comprise part of a liner which surrounds the flow passage of the valve, not illustrated.

Body 12 is provided with an enlarged counterbore 16 defined by a sidewall 18 and a bottom wall or base 20 which is disposed at substantial right angles to the axis of the valve stem.

A plurality of resilient rubberlike O-rings 22, 24, 26 and 28 are received within bore 16, the lowermost O-ring, 22, being supported on lower surface or base 20 of bore 16.

A plurality of annular spacer rings 30, 32, 34, and 36, fabricated from suitable plastic or metal are received within bore 16, and said, spacer rings 30, 32 and 34 are disposed between O-rings 22, 24, 26 and 28 respectively. The uppermost annular spacer ring 36 overlies the uppermost O-ring 28, as illustrated.

The lower axial surface 38 of an outwardly flanged cylindrical gland 40 is disposed in abutting engagement with the upper surface of the uppermost annular spacer ring 36. The cylindrical portion 43 of gland 40 is disposed in snug surrounding relationship with the outer surface of liner sleever 14 and in sliding contact therewith; and in the preferred embodiment of the invention, the upper, out-turned flanged portion 42 of the gland projects above and beyond the upper end 44 of liner sleeve 14.

The numeral 46 denotes a rigid pressure adjusting ring which is removably retained within the enlarged terminal bore 48 of the valve body 12 by means of a resilient retaining ring 50 received within annular groove 52.

A plurality of screws 54 threadably engage and extend through adjusting ring 46 of imparting an axial movement and force to gland 40, which latter applies a compressive force to each of the four O-rings 22, 24, 26 and 28 of such magnitude as to distort said O-rings from their original, normally circular cross section to a substantially rectangular cross section. Each of said O-rings will thereby assume a four-point contact with adjacent surfaces of liner sleeve 14, bore 16, and two of the annular spacers.

Specifically, the lowermost O-ring 22 will be compressed, incident to downward movement of gland 40, whereby to have substantial areas of contact with each of the following surfaces: outer surface of liner sleeve 14, bottom wall or base 20 of bore 16, vertical wall 18 of bore 16 and the undersurface of annular spacer 30.

By the same token each of O-rings 24, 26 and 28 will be distorted whereby to have extensive areas of contact with the adjacent surfaces of those of the annular spacers between which they are located; the outer surface of liner sleeve 14 and the inner surface of vertical wall 18 of bore 16.

It should be understood that the outer diameter of each of the annular spacer rings 30, 32, 34 and 36 is such as to make a loose sliding engagement with vertical wall 18 of bore 16. The inner diameter of each of said annular spacer rings is sufficiently less than the outer diameter of liner sleeve 14, to preclude any substantial contact or engagement of said inner diameter with the liner sleeve.

From the foregoing it will be noted that the construction provides simple, yet highly effective means for applying compressive forces radially to the self-lubricating sealing sleeve 14 at a plurality of annular-spaced sealing zones, in such a manner as to positively maintain said sleeve in fluidtight relationship with the outer surface of valve stem 10, while simultaneously providing a positive fluidtight seal between the outer surface of the sealing sleeve and the sidewall of the bore in which the O-rings are housed. It should be noted that each O-ring when compressed, establishes an annular sealing zone between the flexible liner 14 and stem 10, the sealing zones being spaced from one another by the spacing effect of the series of separated spacer rings.

Figure 2:
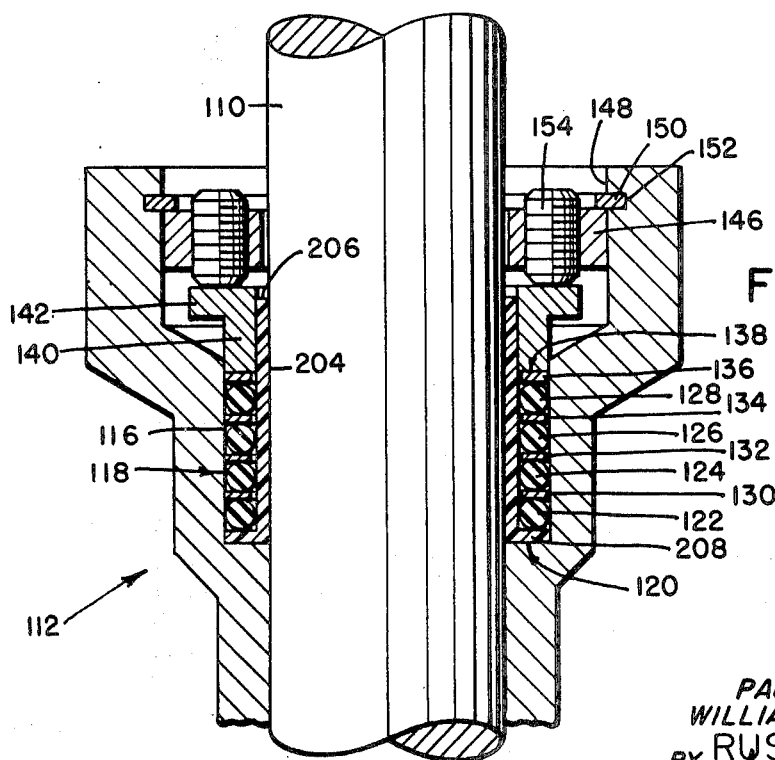
FIG. 2 is a view similar to FIG. 1 but illustrating the invention as applied to a liner sleeve such as would be used in conjunction with the actuating member of a plug, ball or gate valve.

With reference now to FIG. 2 those elements which are common to those of FIG. 1 have been denoted by numerals increased by 100, viz: body 12 of FIG. 1 is body 112 of FIG. 2; O-ring 22 of FIG. 1 is O-ring 122 of FIG. 2, etc.

The primary distinction between the structures of FIGS. 1 and 2 resides in the structural details of the liner sleeve which in FIG. 2 is denoted by the numeral 204 having an upper end 206, and a lower end which includes and terminates in an out-turned annular flange 208 engaging the lower wall 120 of bore 116.

The lowermost O-ring 122 engages the outer wall of liner sleever 204; the upper surface of out-turned flange 208; the inner surface of vertical wall 118 of bore 116; and the undersurface of annular spacer ring 130.

The axial compressive force applied by gland 140 will result in the application of a plurality of radial compressive forces to the liner sleeve 204 of such a magnitude as to provide an efficient, fluidtight seal between the adjacent surfaces of the liner sleeve and valve stem 110. Likewise the lower terminal flange 208 of the liner sleeve will be maintained in positive sealing relationship with the base or lower surface 120 of vertical bore 116, and the contact between O-ring 122 with vertical wall 118 of bore 116 will effectively preclude the passage of pressure media upwardly along wall 118.

It should be noted that the sealing means of the subject invention may be utilized for not only effecting a positive fluidtight seal between a liner sleeve and a valve stem mounted for rotary motion, but also it will provide a positive seal between a liner sleeve and a valve stem mounted for axial motion.

The modification FIG. 3, substantially duplicates FIG. 2, except for the fact that the liner sleeve 204 has its out-turned annular flange 208 turned upwardly to provide an outer concentric wall 210 disposed in spaced parallelism with sleeve 204, to provide a well confining all the O-rings and the spacer rings 130, 132, 134, 136 which separate them. The concentric wall 210 may extend upwardly past the uppermost spacer ring 136, by preference, to accommodate a portion of gland 140.

By providing the concentric wall 210, fluid that may escape along the stem 110 and lower wall 120 will not reach the spacer rings and the intervening O-rings. Also, multiple seals will be established between the concentric wall 210 and the inner wall of bore 116, to additionally defeat such leakage of fluid. The concentric wall 210 may be an integral cylindrical extension of the liner sleeve 204, as shown.

With the structure disclosed, the operating stem of a valve may be rotated, or reciprocated, with extraordinary ease and a minimum amount of wear, since the resilient O-rings have no direct bearing or drag upon the stem when in motion; instead, the stem moves within the self-lubricating sleeve 14, or 204, which is inherently slippery and highly resistant to corrosion and wear. In some forms of the valve, the sleeve 14 or 204 may be secured to move with the stem, in which case the series of annular sealing zones will occur between the self-lubrication sleeve and the several O-rings. In either case, the O-rings have no physical contact with the valve stem, and their inherent tendency to impose a drag opposing movement of the valve stem, is effectively overcome.

What is claimed is:

1. In a valve, the combination of: a valve body having a stem-receptive bore, and an actuating stem movable within said bore to position a valving member within the body; a preformed elongate cylindrical liner supported in said bore to surround a portion of said stem; a plurality of deformable rings surrounding the liner, a plurality of circular spacing rings loosely surrounding the liner interposed between the deformable rings and maintaining the deformable rings spaced from one another, the deformable rings imposing constrictive force thereon pressing the liner into annular sealing contact with said stem.

2. The valve as defined by claim 1, wherein said elongate cylindrical liner is formed of a material having self-lubricating, wear resistant, and corrosion resistant qualities.

3. The valve as defined by claim 1, wherein said liner is formed of a self-lubricating material of the class of polytetrafluoroethylene.

4. The valve as defined by claim 1, wherein said deformable rings are of resilient material; and means for applying compressive force to said deformable rings and said spacing rings, to spread at least some of the deformable rings into four-point contact with the liner, the spacing rings, and the body of the valve at the stem-receptive bore.

5. The valve as defined by claim 4, wherein the means last mentioned includes a slidable cylindrical gland having an inner end movable into compressive relationship with the spacing rings and said deformable rings, and means including a pressure ring and adjusting screws for advancing the inner end of the gland with selective force into the compressive relationship aforesaid.

6. The valve as defined by claim 4, wherein each of spacng spacing rings has an inner diameter greater than the outer diameter of the liner to the extent that said spacing rings apply no appreciable radial force to the liner.

7. The valve as defined by claim 4, wherein the deformable rings are of a resilient rubberlike material.

8. The valve as defined by claim 4, wherein said resilient deformable rings are compressed to assume a substantially rectangular cross section.

9. The valve as defined by claim 1, wherein the stem-receptive bore of the valve body has a base wall; and the liner includes an outwardly directed annular flange overlying said base wall.

10. The valve as defined by claim 9, wherein said spacing rings have an inner diameter greater than the outer diameter of the liner to the extent that said spacing rings apply no appreciable radial force to the liner.

11. The valve as defined by claim 10, wherein the spacing rings and the deformable rings are stacked upon the annular flange of the liner, to apply force to said flange.

12. The valve as defined by claim 11, wherein said elongate cylindrical liner is formed of a material having self-lubricating qualities.

13. The valve as defined by claim 1, wherein said liner includes a concentric extension cooperating with said liner to provide a well accommodating the deformable rings and the spacing rings, said concentric extension being closely fitted within the bore of the valve body.

14. The valve as defined by claim 13, wherein said liner and the cylindrical extension thereof are formed of a material having self-lubricating properties.